July 5, 1927.
W. J. McCAUGHEY
1,634,505
OXYCHLORIDE CEMENT AND PROCESS OF MAKING SAME
Filed May 1, 1922
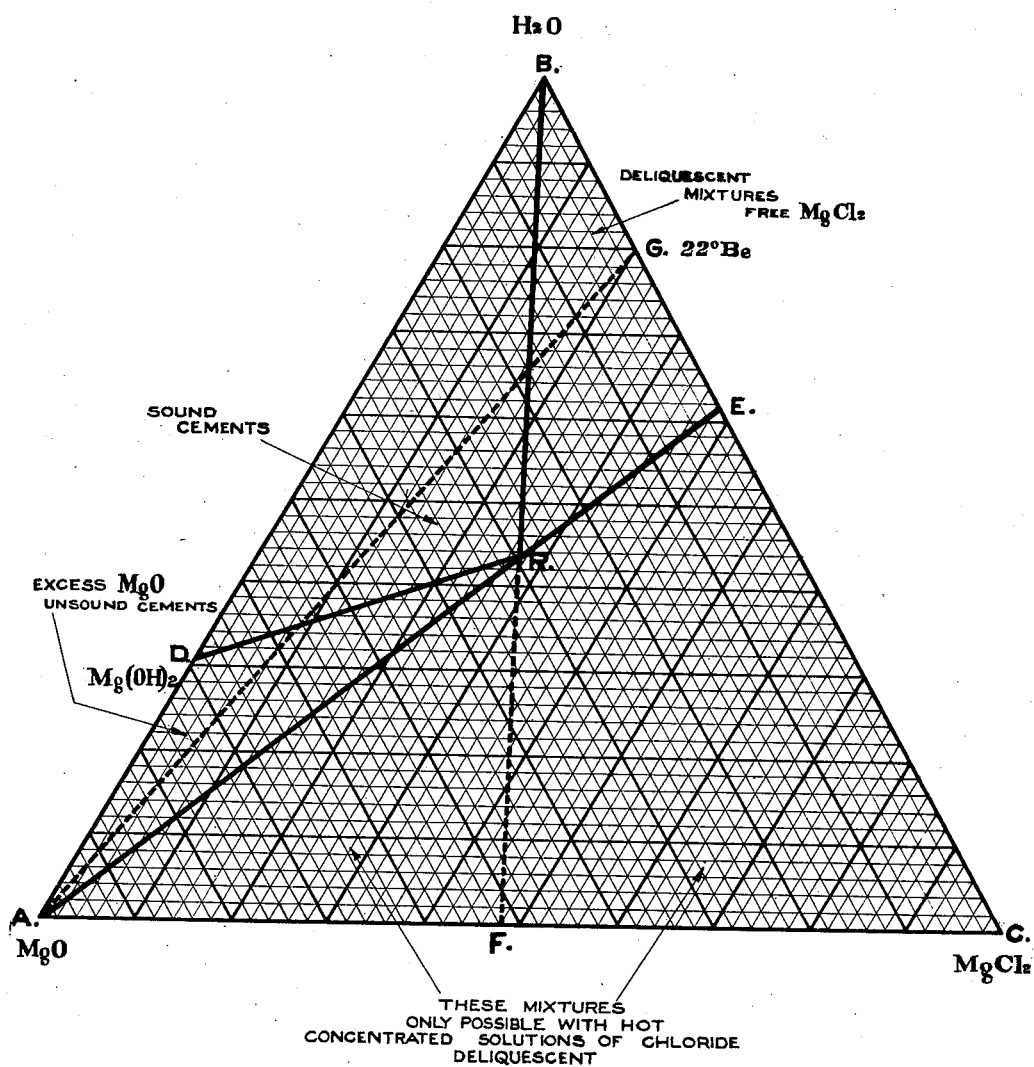

Patented July 5, 1927.

1,634,505

UNITED STATES PATENT OFFICE.

WILLIAM J. McCAUGHEY, OF COLUMBUS, OHIO, ASSIGNOR TO THE CLEVELAND TRUST COMPANY, OF CLEVELAND, OHIO, A CORPORATION OF OHIO.

OXYCHLORIDE CEMENT AND PROCESS OF MAKING SAME.

Application filed May 1, 1922. Serial No. 557,513.

This invention relates to oxychloride cements, commonly known as Sorel cements, and an improved process of making same.

One object of the invention is to improve the quality of Sorel cements including the prevention of their deterioration with age.

Another object of the invention is to reduce the cost of producing such cements.

A further object of the invention is the efficient utilization of relatively abundant natural deposits of magnesian limestone as a source of magnesium oxide for the cement.

Another object of the invention is the utilization of a by-product of the manufacturer of dolomite lime which has heretofore been of little value.

Other objects more or less incidental or ancillary to the foregoing and the manner of attaining all of the various objects will appear in the following detailed description of my improved product and the preferred methods of producing it, reference being had in said description to the accompanying drawing which shows a tri-axial composition diagram of Sorel cement.

Prior to my invention Sorel cements have been made in practically all cases of calcined magnesite and a suitable chloride solution, usually magnesium chloride, although other chlorides, such as calcium chloride, have been used. Usually the cement proper has added to it suitable inert fillers or aggregates, such as sand, asbestos, broken rock, cinders, saw-dust, cork-dust, and the like, according to the specific use to which the cement is to be put. These prior Sorel cements utilizing magnesite as a source of magnesium oxide, when properly compounded, have relatively great strength and other good qualities. However, the limited distribution of the deposits of sufficiently pure magnesites and their resulting high cost have made the cost of these Sorel cements relatively high. Furthermore, in practice it has been difficult to compound the Sorel cements in such a manner that they would withstand weathering satisfactorily and would not deteriorate more or less with age.

The extensive deposits in the United States of magnesian limestone known as dolomite have suggested the use of calcined dolomite in place of calcined magnesite in the production of the oxychloride cements, it being possible to converted the magnesium carbonate of the dolomite into magnesium oxide without decomposition of the contained calcium carbonate because the vapor pressure of magnesium carbonate is much higher than that of calcium carbonate at a given temperature. The vapor pressure of magnesium carbonate reaches atmospheric pressure at a temperature of about 400° C. and the vapor pressure of calcium carbonate does not reach atmospheric pressure until a temperature of nearly 900° C. is attained. It has been shown by one investigator that calcium carbonate in an atmosphere of $CO_2$ does not begin to decompose until a temperature of about 815° C. is reached. By calcining dolomite at temperatures below 815° C. it is possible to convert substantially all of the magnesium carbonate into magnesium oxide without the production of any considerable amount of lime (CaO). However, I have found that oxychloride cements made of dolomite calcined in this manner and combined with magnesium chloride solution are open to the serious objections that they require a relatively long time to set (fully three times as long as oxychloride cements made of calcined magnesite), have relatively low initial strength, and require so much more chloride solution to bring them to the desired degree of plasticity that either an injurious excess of chloride results or, if a weaker solution is used, an excess of water with attendant porosity of the cement results.

From the investigations I have made I believe that the deterioration of the oxychloride cements with aging is usually due to one or more of the following causes, namely, the presence of an excess of chloride, which is deliquescent in the presence of a moist atmosphere, the gradual crystallization and weakening of the cement bond, said bond being initially colloidal, the presence of an excess of magnesium oxide which, in the presence of moisture, hydrates and increases in volume, and the presence of free lime which also, in the presence of moisture, hydrates and increases in volume. If in practice it were possible to closely control the composition of the cement these defects and difficulties could practically entirely be overcome. But such close control of the composition is as a practical matter impossible, especially as more or less variable natural deposits are used as the source of magnesium oxide. However, I have succeeded in very largely overcoming the deterioration of the cement incident to crystallization and I have found it possible by combining calcined magnesite and partially calcined dolomite in suitable proportions to produce oxychloride cements free from most of the faults characteristic of cements heretofore made of dolomite and at a cost closely approaching that of cements produced entirely of dolomite. Also, by means of a special calcination treatment of dolomite, I have succeeded in producing cements using dolomite alone as a source of oxide which have characteristics closely approximating and in some respects superior to the characteristics or qualities of the best oxychloride cements made of magnesite.

To produce cements by my improved process I prefer to employ a suitable magnesite, such as that from the Grecian deposits, calcined at a high temperature, say 800° C. to 1000° C., and ground to pass a fine mesh screen, say 90% through a 200 mesh screen. I also take dolomite rock, burn it so as to calcine a considerable part and preferably all or substantially all of the magnesium carbonate but with decomposition of little or none of the calcium carbonate and similarly grind it to small particle size. For convenience I will refer to the dolomite rock thus burned as magnesia calcined dolomite. I then mix the ground calcined magnesite and magnesia calcined dolomite in suitable proportions, preferably not less than 50% and not over 80% of the magnesia calcined dolomite. With this mixed finely ground material I combine a small amount of glycerine, which acts as a protective colloid to retard crystallization as the cement ages, and also a suitable amount of magnesium chloride solution to react with the magnesium oxide and produce the cement bond. Solutions of other chlorides, known to react with magnesia in a similar manner, can be used alone, in combination with each other or with magnesium chloride, in lieu of the magnesium chloride alone. Calcium chloride, for example, can be used and has the advantage of low cost. However, as is known, it has the disadvantage that it reacts slowly with magnesia; and consequently it can best be used in combination with magnesium chloride. For most purposes I prefer to use magnesium chloride alone as its cost is moderate and it produces a cement that sets in a suitable length of time. Ordinarily a certain amount of inert filler or aggregate is added to the mix. A typical composition of my improved cement, including the aggregate, is as follows:

| | |
|---|---|
| Magnesia calcined dolomite | 20 pounds. |
| Calcined magnesite | 5 pounds. |
| Glycerin | 3 ounces. |
| Sand | 70 pounds. |
| Asbestos fibre | 3–5 pounds. |
| Magnesium chloride solution of 18°–22° Bé., sufficient to render mix suitably plastic, usually about | 20 pints. |

In the above given composition the amount of dolomite given contemplates substantially complete calcination of its magnesium carbonate.

Instead of adding chloride solution to the dry mix, flake magnesium chloride ($MgCl_2.6H_2O$) can be mixed with the finely ground dry material and water added later when it is desired to use the cement. Thus for the 20 pints of chloride solution above there might be substituted about 8 to 11 pounds of flake chloride and to the resulting dry mix about 15 pints of water should be added when the cement is used.

While, as above indicated, I prefer to use magnesite calcined at high temperatures and very finely ground, it is to be understood that any of the commercial grades of ground calcined magnesite can be employed with some measure of success provided they do not contain an unduly large amount of free lime. A certain amount of free lime, up to 2.5%, is not harmful, in fact I have found such small amounts positively beneficial in some cases. But in larger amounts lime is objectionable and if the amount is not too great it is possible and desirable to satisfactorily neutralize it by addition of sulphuric acid. Thus, in the case of the composition given above, if the dolomite-magnesite mixture contained 4% free lime, 100 c. c. of sulphuric acid should preferably be added to the mix when the cement is mixed for use.

The flake magnesium chloride referred to is a product that has recently come on the market, that known to me being produced by the Dow Chemical Company of Midland, Michigan. With respect to the magnesia calcined dolomite, while in the broader aspects of my invention use can be made of dolomite calcined at the relatively low burning temperature heretofore used, I have found it possible to secure much more satisfactory results by following a special burning practice which I shall now describe.

Instead of grinding the dolomite rock or reducing it to relatively small sized pieces before burning in accordance with the prior practice, I select a suitable dolomite, preferably of the character of the Niagara limestone of northwestern Ohio, and prepare it in blocks of substantial size ranging preferably from 10 inches to 20 inches on a side and fire these blocks in ordinary externally fired shaft kilns such as are used in the burning of lime and at temperatures ranging materially above 815° C. I have found a temperature of 1100° C. to give very satisfactory results. This burning is continued until the magnesium carbonate is substantially all calcined, through to the centers of the blocks. The time requisite for this will vary somewhat with the size of the blocks and the particular temperature employed. With the kiln temperature of about 1100° C. and 8 to 10 inch blocks of dolomite of the character of the Niagara limestone of northwestern Ohio, the calcination of the magnesium carbonate is completed in 3 to 4 hours subjection to said high temperature, it being understood that the rock is in the kiln for a much longer period (2 to 3 days) during which it is fed down to the high temperature zone. However, the quality of the product is not harmed if the burning is prolonged after the calcination of the magnesium carbonate is complete, nor is the quality affected, in so far as chemical characteristics are concerned, if the burning is stopped before all of the magnesium carbonate is calcined. Ordinarily, of course, it is desirable to substantially complete the calcination of the magnesium carbonate so as to make available as much magnesium oxide as possible.

When the burning has thus been completed, the blocks on being taken from the kiln are found to consist of a friable outer shell of completely calcined material. That is, this shell is made up of a mixture of magnesium oxide and calcium oxide. These friable shells are readily broken off by the use of sledges or the like and the cores which remain are found to be made up of magnesium oxide and calcium carbonate. The completely calcined shell material constitutes dolomitic lime of a very excellent quality and I use it as such. The core material constitutes what I have referred to as magnesia calcined dolomite and I grind it and use it as a source of magnesium oxide and inert filler for my improved Sorel cement. The ground material may be used in combination with calcined magnesite as above described, in which case I secure a product that is in substantially every respect equal in quality to the best Sorel cement made with calcined magnesite alone and which is superior to the best magnesite cement in that it is not subject to loss of strength and to disintegration with age. Furthermore it is produced at a cost substantially less than the cost of producing the all magnesite cement.

However, the dolomite calcined in the manner last described can be used without admixture of calcined magnesite to produce a Sorel cement very greatly superior to cement made of dolomite calcined at lower temperatures in accordance with prior suggestions. For most purposes I prefer not to use dolomite alone but a mixture of 80% magnesia calcined dolomite and 20% calcined magnesite as I thereby secure a product superior in some respects to that secured with dolomite alone and at an expense very little greater than the cost of the all dolomite cement. It will of course be understood that where dolomite alone is used the amount taken will be determined by its magnesium oxide content, which should be made equivalent to the magnesium oxide content of the combined dolomite-magnesite cement. Also the amount, if any, of silex or other fine aggregate added will take into account the increased amount of calcium carbonate filler which is present in the case of the all dolomite cement, and also more water will be required on account of the greater percentage of fine aggregate.

There are a considerable number of factors involved in the production of a satisfactory oxychloride cement and in order that the nature and significance of my improvements may be clearly understood and that light may be thrown upon the best method of practicing the invention, reference is had to the accompanying drawing which shows a tri-axial composition diagram of Sorel cement. The Sorel cement bond is known to consist of a compound of magnesium oxide, water and magnesium chloride. Accordingly the symbols of these three substances are placed at the corners of the triangle ABC. As will be readily understood by those familiar with diagrams of this character any point within the bounds of the triangle represents a definite composition (percentage by weight) of the three constituent materials, the percentage of each constituent being determined by the distance of the point from the base line opposite the angle of the constituent in question. The point R, near the middle of the diagram, represents the composition of the bond of Sorel cement as determined by the investigations of Robinson and Waggaman, namely, $3MgO.MgCl_2.10H_2O$. This bond material before it has set is highly liquid and after it sets it has a translucent glassy appearance. As this composition represents an approximately saturated solution of the chloride we may draw a straight line AE through the point R to form a triangle AEC. Compositions within this latter triangle must contain an excess of magnesium chloride and can be produced only by preparing a super-saturated solution of the magnesium chloride as by heating the chloride solution above ordinary room temperatures. If this were done there would be excess of chloride when the solution or cement cooled to normal temperatures and this would be highly objectionable on account of the deliquescent character of the chloride. Consequently compositions within the triangle AEC may at once be discarded as undesirable.

Again if we draw a straight line BRF, we find within the triangle BRE compositions representing an insufficient amount of the magnesium oxide with respect to the magnesium chloride. These compositions too are deliquescent because of the excess chloride and can also be ruled out as undesirable.

Magnesium oxide and water combine to form magnesium hydrate $Mg(OH)_2$, the composition of which is represented on the diagram by the point D. Drawing the line DR we have the triangle ADR representing compositions with an excess of magnesium oxide with respect to the water. Such compositions are undesirable for the reason that in the course of time in moist atmospheres the excess magnesium oxide distributed through the mass will hydrate and when magnesium oxide hydrates it swells to more than twice its original volume. Obviously when this occurs in the body of cement, disintegration is certain to result if the action is at all extensive.

Thus we have remaining only the area represented by the triangle DBR within which the compositions give sound cements capable of aging satisfactorily under ordinary conditions of service. Compositions within this triangle can be defined as mixtures of positive amounts of magnesium hydroxide $(Mg(OH)_2)$, water and a substance of the composition $3MgO.MgCl_2.10H_2O$. In the diagram the point G represents a 22° Bé solution of magnesium chloride and if we draw the line AG then compositions on or near this line within the triangle DBR will be found to give very satisfactory results. It is not desirable to select a composition too close to the line DR because the compositions of even the best magnesites and dolomites vary some and this variation should be allowed for to avoid the possibility of crossing the line DR into the area ADR representing excess of magnesium oxide with attendant unsoundness of the cement due to hydration.

Again, compositions with an excessive amount of water should be avoided as the eventual vaporizing of the water leaves the cement porous.

Theoretically a cement with the composition represented by the point R is the best and strongest Sorel cement that can be produced. But practically this composition, or any composition approaching it, is not useful because it gives a cement mix that is highly liquid. It is for this reason that a more or less inert filler or aggregate is necessary in the practical working of Sorel cements. Heretofore the most satisfactory commercially produced Sorel cements have contained in addition to finely ground calcined magnesite, a substantial amount of very finely ground filler such as silex, in addition to more or less aggregate of coarser character such as sand, asbestos and the like. Such finely divided aggregate performs two useful functions. First, its finely divided particles have very extensive surface areas and take up on these surfaces a good deal of the chloride solution so that the resulting mix is stiff enough to work and handle in a practical manner in the coating of walls and ceilings or other surfaces where the cement must be stiff enough to be self-supporting. Second, the fine particles fill the voids between the coarser materials and make the cement denser and more nearly water-proof. It is, of course, undesirable that all of the aggregate be extremely fine, some coarser material often being necessary to secure a cement structure of adequate strength.

From the foregoing discussion, one marked advantage incident to the use of magnesia calcined dolomite will be readily understood. The un-calcined calcium carbonate of the dolomite, when the latter is ground, constitutes a very excellent finely divided filler which takes up the chloride solution and gives a mix sufficiently stiff to be readily worked and handled. Furthermore the calcined dolomite is relatively soft and can be ground to fine particle size readily. The equivalent fine grinding of hard materials, such as silex, is much more expensive. Thus by the use of dolomite I secure not only a much cheaper source of magnesium oxide but in addition provide an exceedingly cheap source of very fine aggregate. A further consideration in favor of calcium carbonate as a filler is its whiteness, a pure white cement being desirable for many uses.

I have referred to the fact that my improved dolomite-magnesite cement is not subject to the deterioration in strength on aging which characterizes the all-magnesite cements. I believe this result is, in part at least, due to the fact that the dolomite core material reacts with water to form $Mg(OH)_2$ more quickly than does the magnesia in calcined magnesite, while the latter, on the other hand, reacts more quickly with $MgCl_2$ than does the core material. Consequently, the Sorel bond, in the case of magnesite, is formed quickly and sets before excess magnesia present has had opportunity to hydrate with the excess water. As hydration of magnesia increases its volume over 100 per cent, such hydration and attendant swelling in the cement after the latter sets must weaken the Sorel bond. In the case of my dolomite cement the conditions are more favorable to hydration of the magnesia before the bond sets. In addition the molecular dispersion of the magnesia through the calcium carbonate in the dolomite would insure that any delayed hydration of magnesia would affect but minute amounts of material at any given point and the resultant swelling would be such as the natural elasticity of a Sorel cement mass can accommodate without overstressing the bond.

A further advantage of my dolomite cement over that made with magnesite alone is its freedom from the surface checks or cracks that characterize the magnesite cement.

I have already referred in a general way to the superior quality of cement made with dolomite burned by my improved high temperature process, as compared with dolomite burned in accordance with prior practice. The low temperature dolomite cement sets much more slowly than my high temperature dolomite cement. Its initial strength, also, develops much more slowly. In addition, it is apparently more porous and requires more solution to secure the desired plasticity than does my high temperature dolomite cement. In other words, the latter product more nearly resembles magnesite cements in its physical properties and in its reaction with chloride solutions than do low temperature dolomite cements. This advantage is especially notable where my high-burned dolomite is combined with magnesite.

As previously stated, I prefer for most uses a dolomite-magnesite mix to an all dolomite material. There are several reasons for this. Thus as compared with a mix made up of 80% magnesia calcined dolomite and 20% calcined magnesite, the all dolomite material would have about twice as much very fine aggregate and that would be enough to unduly lower the strength of the cement for some purposes. Again the all dolomite material would have twice as great tendency to contain a dangerous amount of lime. Finally the all dolomite material takes longer to set, and for some uses that would be an objection. However, notwithstanding these considerations, my high temperature magnesia calcined dolomite produces an all dolomite cement markedly superior to that produced with dolomite calcined by the prior methods.

As previously noted, the magnesian limestone deposits of northwestern Ohio are especially suited to my improved high temperature process of calcination. I believe that this is due to the fact that this dolomite is more porous than some of the deposits found elsewhere. The Niagara limestone was probably originally laid down as marl and this would account for the porosity of the rock. By reason of this porosity, as I believe, it is possible to burn the rock in blocks of considerable size and yet have the calcination of magnesium carbonate proceed to the very center of the block.

While under my preferred procedure the dolomite is burned at a temperature materially higher than that at which calcium carbonate begins to decompose, such decomposition does not result for the reason, as I believe, that vapor pressure of the $CO_2$ within the pores of the rock resulting from the calcination of the magnesium carbonate inhibits the decomposition of the calcium carbonate. In fact, by burning relatively finely divided dolomite in a confined space under back pressure of carbon dioxide a similar result can be secured. Obviously, however, this can be done only at materially higher cost and with greater difficulties than attend the simple procedure previously described of kiln burning of the rock in blocks of substantial size. In this connection it is observed that the kiln burning process is not one requiring close control as to time, temperature and pressure. Considerable variation in the temperature, up to at least 1300° C., is not fatal and if the time of burning is continued after all of the magnesium carbonate in the dolomite is calcined, the result is simply that the completely calcined outer shell of the blocks is thicker and more material is made for lime and less is available for Sorel cement. On the other hand even if the burning is not continued long enough to calcine all the magnesium carbonate, the only objectionable result is the diminution of the magnesium oxide rendered available and a corresponding increase of inert magnesium carbonate filler and this result can be offset, if it be desired to restrict the amount of fine filler, by combining with the calcined dolomite a suitable amount of calcined magnesite. So long as the burning of the dolomite results in calcination of a substantial part of the magnesium carbonate, the product can be used in the ways described to produce my improved cement.

In the production of lime by the calcination of dolomite, the rock in block form is burned in shaft kilns and the temperatures are lower in the central parts of the kilns than near the walls. Consequently, to avoid overburning of the rock near the walls, the rock is drawn from the kiln before that in the central part of the kiln is completely calcined through to the centers of the blocks. Thus these incompletely calcined blocks have cores of $MgO$ and $CaCO_3$ of the same character as the cores produced in carrying out my process. These cores in the lime industry have no value unless reburned or unless used as a filler for hydrate of lime, which latter use is of questionable advantage. As these cores can be used without further treatment to produce my improved cement, it will be seen that the present invention can be practiced to the advantage of both the cement and the lime industries.

While I have described specifically the materials and treatments which I prefer it is to be understood that both as to materials and treatment there can be wide variation within the bounds of the appended claims.

What I claim is:—

1. An oxychloride cement comprising in combination a comminuted mixture of magnesian limestone of which substantially all the magnesium carbonate (MgCO$_3$) is calcined and substantially all the calcium carbonate (CaCO$_3$) is uncalcined, additional magnesium oxide (MgO), and an alkaline earth chloride.

2. An oxychloride cement comprising in combination a comminuted mixture of magnesian limestone of which a substantial part of the magnesium carbonate (MgCO$_3$) is calcined and substantially all of the calcium carbonate (CaCO$_3$) is uncalcined, additional magnesium oxide (MgO), and alkaline earth chloride.

3. A composition of matter comprising a comminuted mixture of magnesium oxide (MgO) and magnesian limestone of which substantially all the magnesium carbonate (MgCO$_3$) is calcined and substantially all the calcium carbonate (CaCO$_3$) is uncalcined.

4. A composition of matter comprising a comminuted mixture of magnesium oxide (MgO) and magnesian limestone of which a substantial part of the magnesium carbonate (MgCO$_3$) is calcined and substantially all the calcium carbonate (CaCO$_3$) is uncalcined.

5. A composition of matter comprising a comminuted mixture of magnesium oxide (MgO) and magnesian limestone of which substantially all the magnesium carbonate (MgCO$_3$) is calcined and substantially all the calcium carbonate (CaCO$_3$) is uncalcined and which has the properties substantially as described characteristic of heat treatment at a temperature materially above 815° C.

6. A composition of matter comprising a comminuted mixture of magnesium oxide (MgO) and magnesian limestone of which a substantial part of the magnesium carbonate (MgCO$_3$) is calcined and substantially all the calcium carbonate (CaCO$_3$) is uncalcined and which has the properties substantially as described characteristic of heat treatment at a temperature materially above 815° C.

7. As a new product of manufacture, a comminuted magnesian limestone of which substantially all the magnesium carbonate (MgCO$_3$) is calcined and substantially all the calcium carbonate (CaCO$_3$) is uncalcined and which has the properties substantially as described characteristic of heat treatment at a temperature materially above 815° C.

8. As a new product of manufacture, a comminuted magnesian limestone of which a substantial part of the magnesium carbonate (MgCO$_3$) is calcined and substantially all the calcium carbonate (CaCO$_3$) is uncalcined and which has the properties substantially as described characteristic of heat treatment at a temperature materially above 815° C.

9. An oxychloride cement comprising in combination an alkaline earth chloride and comminuted magnesian limestone of which substantially all the magnesium carbonate (MgCO$_3$) is calcined and substantially all the calcium carbonate (CaCO$_3$) is uncalcined and which has the properties substantially as described characteristic of heat treatment at a temperature materially above 815° C.

10. An oxychloride cement comprising in combination an alkaline earth chloride and comminuted magnesian limestone of which a substantial part of the magnesium carbonate (MgCO$_3$) is calcined and substantially all the calcium carbonate (CaCO$_3$) is uncalcined and which has the properties substantially as described characteristic of heat treatment at a temperature materially above 815° C.

11. A composition of matter comprising a comminuted mixture of solid alkaline earth chloride, magnesium oxide (MgO), and magnesian limestone of which substantially all of the magnesium carbonate (MgCO$_3$) is calcined and substantially all the calcium carbnote (CaCO$_3$) is uncalcined.

12. A composition of matter comprising a comminuted mixture of solid alkaline earth chloride, magnesium oxide (MgO), and magnesian limestone of which a substantial part of the magnesium carbonate (MgCO$_3$) is calcined and substantially all the calcium carbonate (CaCO$_3$) is uncalcined.

13. An oxychloride cement mix containing magnesium oxide (MgO), magnesian limestone of which substantially all the magnesium carbonate (MgCO$_3$) is calcined and substantially all the calcium carbonate (CaCO$_3$) is uncalcined, and magnesium chloride solution, and having a composition of its total magnesium oxide, magnesium chloride and water which can be expressed as a mixture of positive amounts of magnesium hydroxide (Mg(OH)$_2$), water and a substance of the composition $$3MgO.MgCl_2.10H_2O.$$

14. An oxychloride cement mix containing magnesium oxide (MgO), magnesian limestone of which a substantial part of the magnesium carbonate (MgCO$_3$) is calcined and substantially all the calcium carbonate (CaCO$_3$) is uncalcined, and magnesium chloride solution, and having a composition of its total magnesium oxide, magnesium chloride and water which can be expressed as a mixture of positive amounts of magnesium hydroxide (Mg(OH)$_2$), water and a substance of the composition 3MgO.MgCl$_2$.10H$_2$O.

15. An oxychloride cement mix comprising a comminuted mixture of magnesium oxide (MgO) and magnesian limestone of which substantially all the magnesium carbonate (MgCO$_3$) is calcined and substantially all the calcium carbonate (CaCO$_3$) is uncalcined, an alkaline earth chloride, and sulphuric acid.

16. An oxychloride cement mix comprising a comminuted mixture of magnesium oxide (MgO) and magnesian limestone of which a substantial part of the magnesium carbonate (MgCO$_3$) is calcined and substantially all the calcium carbonate (CaCO$_3$) is uncalcined, an alkaline earth chloride, and sulphuric acid.

17. In the production of oxychloride cement or the like, the steps which consist in burning blocks of magnesian limestone at a temperature materially above 815° C. until each block consists of a friable outer shell of magnesium oxide (MgO) and calcium oxide (CaO) and a core of magnesium oxide and calcium carbonate (CaCO$_3$), separating the friable shells from the cores, and comminuting the cores to form a mixture of magnesium oxide and inert calcium carbonate filler for the said cement.

18. In the production of oxychloride cement or the like, the steps which consist in burning blocks of magnesian limestone at a temperature materially above 815° C. until each block consists of a friable outer shell of magnesium oxide (MgO) and calcium oxide (CaO) and a core containing calcium carbonate (CaCO$_3$) and a substantial amount of magnesium oxide, separating the friable shells from the cores, and comminuting the cores to form a mixture of magnesium oxide and inert filler for the said cement.

19. In the production of oxychloride cement or the like, the steps which consist in burning magnesian limestone at a temperature materially above 815° C. while maintaining the calcium carbonate (CaCO$_3$) thereof in contact with carbon dioxide under a pressure high enough to prevent calcination of such carbonate while permitting calcination of magnesium carbonate (MgCO$_3$), comminuting the burned stone, and mixing with the comminuted product an alkaline earth chloride.

20. In the production of oxychloride cement or the like, the steps which consist in burning blocks of magnesian limestone at a temperature materially above 815° C. until each block consists of a friable outer shell of magnesium oxide (MgO) and calcium oxide (CaO) and a core of magnesium oxide and calcium carbonate (CaCO$_3$), separating the friable shells from the cores, comminuting the cores to form a mixture of magnesium oxide and inert calcium carbonate filler for the cement, and mixing therewith magnesium oxide and magnesium chloride solution in proportions to form a composition of total magnesium oxide, magnesium chloride and water which can be expressed as a mixture of positive amounts of magnesium hydroxide (Mg(OH)$_2$), water and a substance of the composition 3MgO·MgCl$_2$·10H$_2$O.

21. In the production of oxychloride cement or the like, the steps which consist in burning blocks of magnesian limestone at a temperature materially above 815° C. until each block consists of a friable outer shell of magnesium oxide (MgO) and calcium oxide (CaO) and a core containing calcium carbonate (CaCO$_3$) and a substantial amount of magnesium oxide, separating the friable shells from the cores, comminuting the cores to form a mixture of magnesium oxide and inert filler for the cement, and mixing therewith magnesium oxide and magnesium chloride solution in proportions to form a composition of total magnesium oxide, magnesium chloride and water which can be expressed as a mixture of positive amounts of magnesium hydroxide (Mg(OH)$_2$), water and a substance of the composition 3MgO·MgCl$_2$·10H$_2$O.

22. In the process of treating and utilizing magnesian limestone the steps which consist in burning blocks of said stone until each block consists of a friable outer shell of magnesium oxide (MgO) and calcium oxide (CaO) and a core of magnesium oxide and calcium carbonate (CaCO$_3$), separating the completely calcined outer shells from the cores to form lime, comminuting the cores and mixing magnesium oxide and a chloride with the comminuted product to form an oxychloride cement.

23. In the process of treating and utilizing magnesian limestone, the steps which consist in burning blocks of said stone until each block consists of a friable outer shell of magnesium oxide (MgO) and calcium oxide (CaO) and a core containing calcium carbonate (CaCO$_3$) and a substantial amount of magnesium oxide, separating the completely calcined outer shells from the cores to form lime, comminuting the cores and mixing magnesium oxide and a chloride with the comminuted product to form an oxychloride cement.

In testimony whereof, I hereunto affix my signature.

WILLIAM J. McCAUGHEY.